United States Patent [19]

DeFelice et al.

[11] 4,383,330
[45] May 10, 1983

[54] X-RAY CASSETTE HAVING QUICK FILM RELEASE MECHANISM

[75] Inventors: Charles P. DeFelice, Wilmington, Del.; Donald F. LeRoux, Elkton, Md.

[73] Assignee: E. I. Du Pont de Nemours and Company, Wilmington, Del.

[21] Appl. No.: 306,389

[22] Filed: Sep. 28, 1981

[51] Int. Cl.³ .............................................. G03B 17/26
[52] U.S. Cl. ..................................... 378/187; 378/188
[58] Field of Search ................ 378/187, 188, 185, 182

[56] References Cited

U.S. PATENT DOCUMENTS

| Re. 28,438 | 6/1975 | Schmidt | 206/455 |
|---|---|---|---|
| 3,511,990 | 5/1970 | Hauss | 378/187 |
| 3,715,087 | 2/1973 | Schmidt | 242/67.3 R |
| 3,784,835 | 1/1974 | Schmidt | 250/480 |
| 3,836,783 | 9/1974 | Stievenart | 378/188 |
| 3,870,889 | 3/1975 | Schmidt | 250/480 |

Primary Examiner—Alfred E. Smith
Assistant Examiner—T. N. Grigsby

[57] ABSTRACT

An x-ray cassette of the type having a film buckler member is characterized in that the film engaging edge of the buckler member extends substantially perpendicular to the plane of the film. The film engaging surface of the buckler is further provided with upper and lower film catches and a biasing member to retract the buckler member away from the path of the film.

12 Claims, 11 Drawing Figures

X-RAY CASSETTE HAVING QUICK FILM RELEASE MECHANISM

BACKGROUND OF THE INVENTION

This invention relates to an x-ray film cassette and, in particular, to an x-ray cassette having a buckler arrangement adapted to effect quick release of an x-ray film maintained within the cassette.

In the development of x-ray film handling systems equipment has been provided which allows the automatic loading and unloading of x-ray film into a cassette under daylight conditions. Such equipment frees the operator from the need to load and unload a film to and from a cassette in a dark room. Exemplary of such an automatic system is that disclosed in U.S. Pat. No. Re. 28,438 (Schmidt) assigned to the assignee of the instant invention. This reissue patent describes an x-ray film package for use with a daylight loading cassette of the type disclosed in U.S. Pat. Nos. 3,784,835 and 3,870,889 (both to Schmidt and both assigned to the assignee of the present invention). U.S. Pat. No. 3,715,087 (Schmidt) describes a device used for unloading cassettes of the last-mentioned patents under daylight conditions.

In operation, a film sheet is automatically loaded into the cassette which is operative to hold the film between two opposed substantially parallel x-ray intensifying screens during a period of patient exposure. Following exposure, the cassette is unloaded under the influence of gravity using a device as disclosed in the last-mentioned patent which is adapted to release one of the two cassette plates supporting the intensifying screens to thereby relieve the holding pressure from the film sheet and allow it to drop under the influence of gravity into a light-tight container.

For a variety of reasons, it is important that the time required for the film to drop from the cassette be maintained to within a reasonable maximum on the order of approximately seven seconds. It is believed to be most advantageous that the film drop time occupy on the order of two to three seconds. However, it has been found that in cassettes embodying the teachings of the above-referenced patents, the x-ray film exhibits a tendency to adhere to one of the intensifying screens even after the holding pressure is relieved therefrom. It has been attempted to overcome this problem through the use of cantilevered conical actuators disposed along the cassette edges which are actuated by an actuating cam assembly and pivot inwardly of the cassette to thereby edgewise engage the film sheet and buckle the same to define a gap between the sheet and the screen. The entry of air into the gap tends to equalize the pressure forces on both sides of the sheet to permit it to respond to the influence of gravity and drop from the cassette.

It has been found, however, that the conical bucklers of the prior art work most effectively when the x-ray film used in the cassette exhibits no inherent curl or when the curled film used in the cassette is inserted such that the film concave side is placed against the movable back plate of the cassette. Due to the mechanics of film manufacture and storage, it is difficult to provide an x-ray film sheet which will not exhibit any inherent curl. Furthermore, it is unrealistic to assume that replacement film may be packaged with the curl in the same orientation from package to package or that the operator of the x-ray system will consistently mount packages of replacement film in such a way that the automatic dispensing equipment will load film sheets into a cassette with the concave portion of the sheet placed against the back plate of the cassette.

Accordingly, it is believed to be advantageous to provide an x-ray cassette having a buckler assembly which will consistently and reliably operate to buckle the film sheet from one of the supporting plates regardless of the orientation of the curled film sheet within the cassette.

SUMMARY OF THE INVENTION

The instant invention relates to an x-ray cassette of the type having a fixed and a movable plate disposed within a frame, a film sheet having an inherent curl receivable between the plates, means for biasing the movable plate toward the fixed plate, bias release means operative to release the biasing force from the movable plate, a buckler member having a film engaging surface thereon and an actuating cam assembly operatively associated with the bias release means and engagable with the cam surface on the buckler to displace the buckler and thereby bring the film engaging surface thereof into edgewise contact with the film to buckle the same and space a portion thereof from the plate. The invention is characterized in that the film engaging surface of the buckler extends substantially perpendicularly to the plane of the film. The film engaging surface of the buckler is provided with upper and lower film catches, one of which upon displacement of the buckler in response to the actuating cam engages the edge of the film to buckle the same. Preferably, the catches take the form of parallel notches located at the upper and lower ends of the buckler. Alternatively, the catches may be in the form of protuberances extending above the surface of the buckler at the upper and lower ends thereof. The invention is further characterized in that the actuating cam assumes a trapezoidal cross-section with a flattened central portion which when engaged against the cam engaging surface on the buckler maintains the buckler at a predetermined displacement away from the frames of the cassette. Yet further the invention is characterized by the provision of biasing means operatively associated with the buckler for biasing the same toward a retracted position with respect to the edges of the film.

BRIEF DESCRIPTION OF THE DRAWINGS

The invention may be more fully understood from the following detailed description thereof taken in connection with the accompanying drawings which form a part of this application and in which.

DETAILED DESCRIPTION OF THE INVENTION

Figure 1:
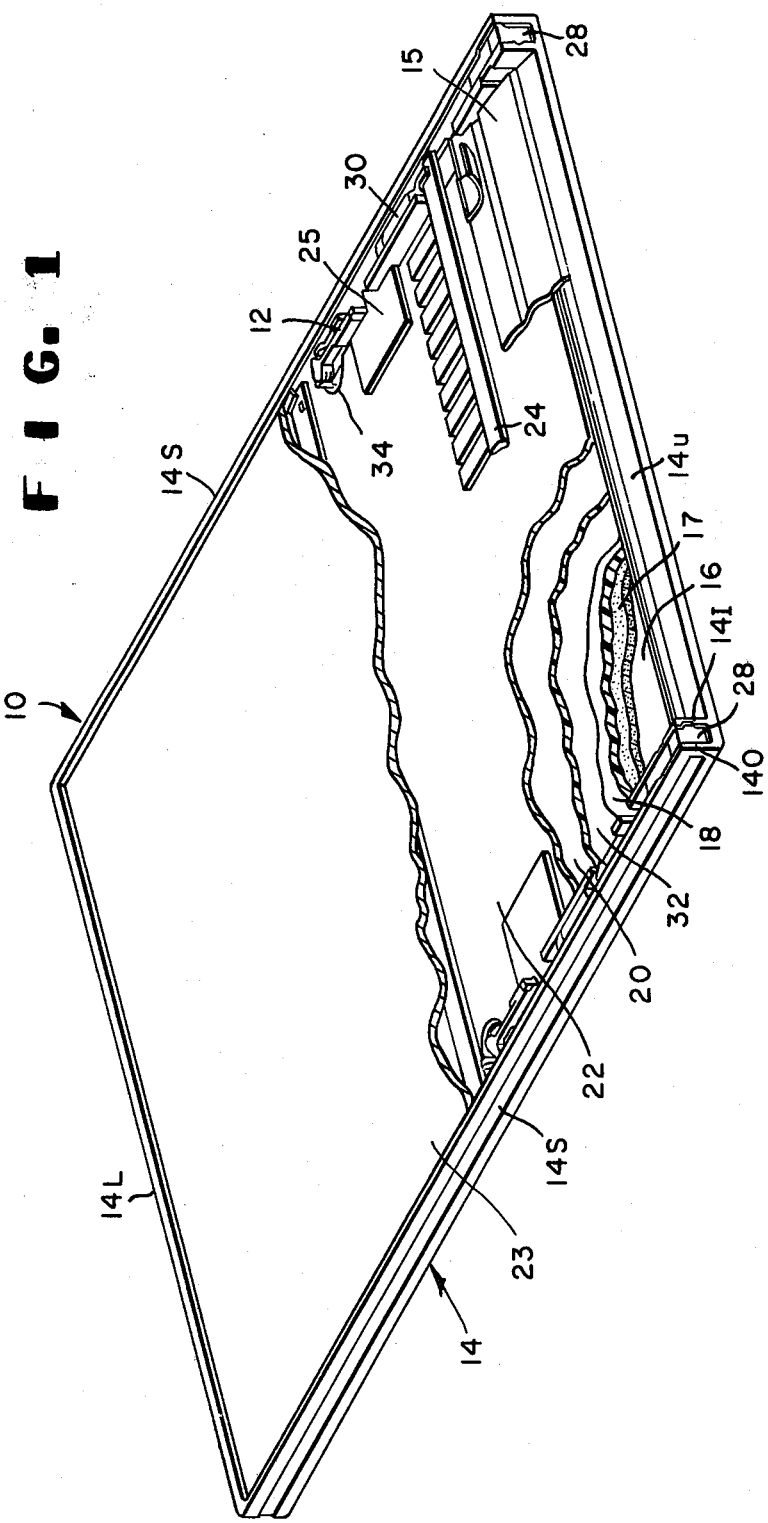
FIG. 1 is a perspective view showing the structure of an x-ray cassette in accordance with the present invention.

Throughout the following detailed description similar reference numerals refer to similar elements in all figures of the drawings. With reference to FIG. 1 shown is a perspective view of an x-ray cassette generally indicated by reference character 10 with which a buckler assembly 12 in accordance with the instant invention is utilized. The cassette 10 is formed of a rectangular frame 14 having opposed sidewalls 14S and upper and lower walls 14U and 14L, respectively. The upper frame wall 14U includes a slot through which a film sheet may be inserted or retrieved from the cassette. A light gate 15 covers the slot when the cassette is closed. On the frame 14 is mounted an opaque x-ray transparent front or window plate 16. The plate 16 is fixedly mounted to the rectangular frame 14. The window plate 16 is fabricated of magnesium sheet although any suitable material meeting the above qualifications, such as aluminum, may be utilized. Disposed above the window plate 16 is a foam pad 17 and an x-ray intensifying screen 18. A second x-ray intensifying screen 20 is mounted to a backing plate 22 which is movably disposed within the frame 14. A rear plate 23 also mounted on the frame 14 completes the cassette 10. The plates 22 and 23 may be fabricated of aluminum or any other suitable material.

The sidewalls 14S of the frame 14 assume a channel cross-section having an inner and outer rail 14I and 14O, respectively. An appropriate number of biasing elements 24 are pivotally mounted on the inner rail 14I of the channel sidewalls 14S and extend transversely across the width of the frame 14. The biasing elements act to support the backing plate 22 and bias it toward the window plate 16. Reinforcing tabs 25 may be provided in larger size cassettes to reinforce the backing plate 22.

A cam rail assembly 28 is slidably received within each of the channels. Camming surfaces 30 on the cam rail 28 engage and actuate the biasing elements 24 to alternately release or urge the movable backing plate 22 against the window plate 16.

With a cam rail 28 in the first position, the biasing force imposed by the biasing elements 24 on the back plate is released defining a space between the backing and the window plates sufficient to allow an x-ray film sheet 32 to be received between the two intensifying screens. With the cam rail 28 in a second position, the biasing elements 24 urge backing plate 22 toward the window plate 16 to provide intimate contact between the two intensifying screens 18 and 20 and the film sheet 32 sandwiched there between. The intensifying screens 18 and 20 and the backing plate 22 are provided with notches or cutouts 34 at predetermined locations thereon to facilitate buckler 12 intrusion into the film area.

In operation, in order to release the film 32 following exposure thereof, the cam rail 28 is displaced to the first, releasing, position to relieve the biasing force from the back plate 16 and thereby permit the film sheet 32 to fall under the influence of gravity to a suitable receptacle. To facilitate the quick release of the film from within the cassette, at least one but preferably four buckler assemblies 12 in accordance with the instant invention are provided at predetermined locations along the channel of the sidewalls 14S of the frame 14.

Figure 3:
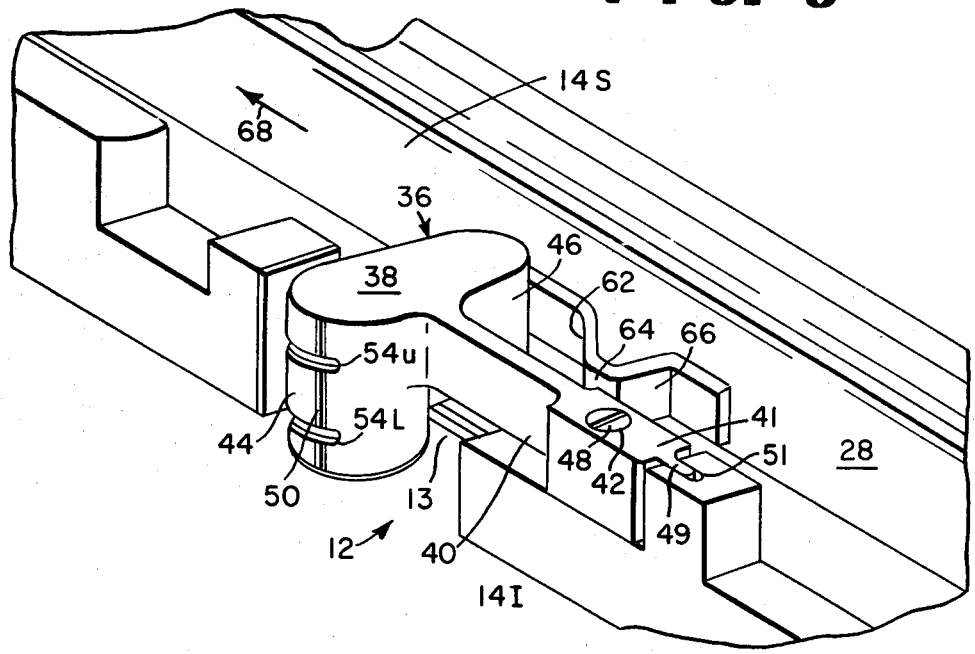
FIG. 3 is an enlarged perspective view of the circled portion of FIG. 2 showing a buckler assembly in accordance with the present invention.
Figure 10:
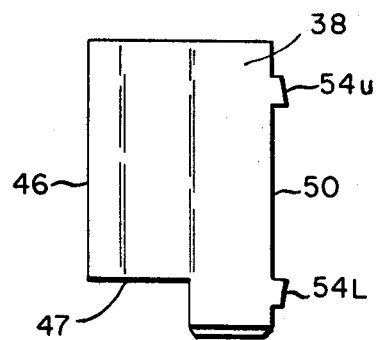
FIGS. 10 and 11 are elevation views of a buckler head illustrating alternate embodiments of the film catches in accordance with the present invention.

With reference to FIG. 3, an enlarged perspective view of an individual one of the buckler assemblies 12 is shown. The buckler assembly 12 comprises a buckler member 36 having an abutment or head portion 38 integrally connected to an arm 40. The arm 40 terminates in a thickened rear portion 41 having a central aperture 42 extending therethrough. The head portion 38 includes a first film engaging surface 44 and a second cam riding surface 46. A cutout portion 47 (FIGS. 10 and 11) is provided on the buckler head 38 to allow the head to retract into a cutout 13 formed in the inner rail 14I. The buckler member 36 is mounted to the rail 14I of the sidewall 14S with a screw 48 insertable through the aperture 42. A tab 49 extends behind the rear portion 41 of the buckler member and is receivable by a recess 51 in the rail 14I to prevent buckler rotation. The arm 40 is connected to the head 38 at a point intermediate the film engaging surface 44 and the cam riding surface 46. As a result of this arrangement the cutout 34 in the screen is minimized, thus minimizing the portion of the film 32 that does not get imaged by the x-ray exposure.

Figure 4:
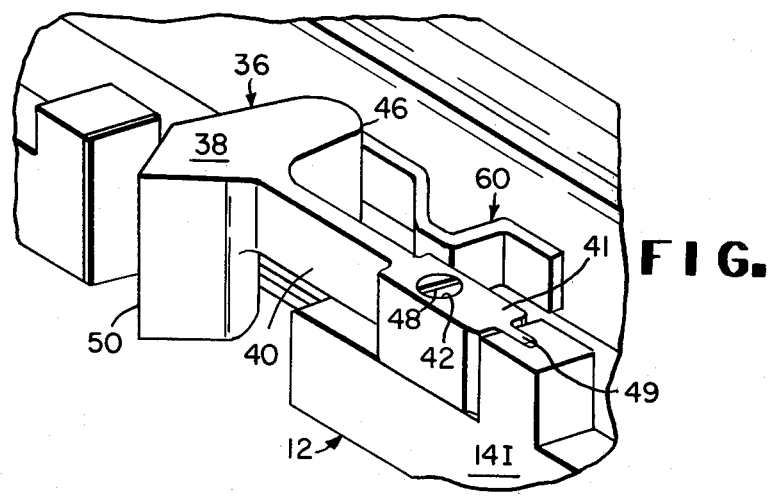
FIGS. 4, 5 and 6 are views similar to FIG. 3 illustrating alternate forms of a buckler member in accordance with the instant invention.
Figure 6:
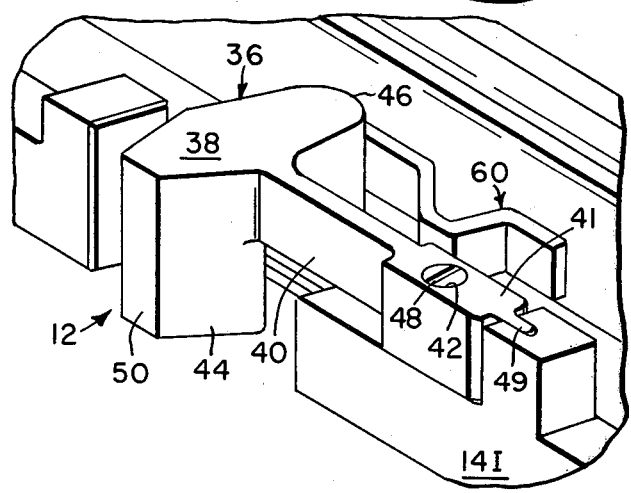
Figure 5:
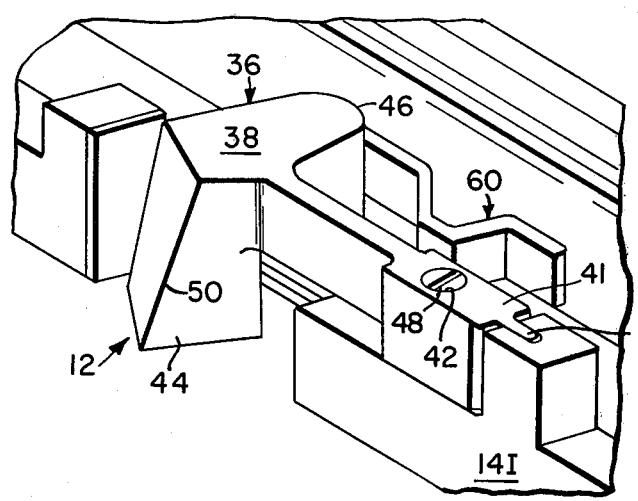

As seen in FIG. 3, the film engaging surface 44 exhibits at least one film contacting edge 50 lying in a plane substantially perpendicular to the plane of the film sheet. While the drawing depicts the film engaging surface 44 as cylindrical in shape, it is to be understood that any cross-sectional configuration for the head 38 which defines at least one edge 50 lying in a plane substantially perpendicular to the plane of the film remains within the contemplation of this invention. Examples of several possible alternate configurations for the head 32, including a head exhibiting a planar surface, are shown in the FIGS. 4, 5 and 6.

Figure 11:
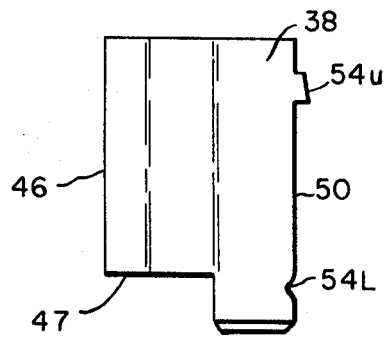

The film engaging surface 44 has upper and lower film catches 54U and 54L thereon. The catches 54 are disposed to engage the edge of the film regardless of the direction of any curl of the film and thereby enhance the buckling action of the buckler assembly 12. The catches 54 are arranged to positively engage the film. To effect this purpose, the catches 54 may take the form of a notch or depression into the surface 44 of the head (FIG. 3) or alternatively, a protuberance from the surface 44 (FIG. 10) or a combination thereof (FIG. 11). The film engaging surface 44 may be smooth or rough and remain within the contemplation of the present invention.

It should be noted that the purpose of the biasing action is to retract the head from the path of the following film so as not to hinder the release of said film from the cassette. Accordingly, in the preferred embodiment, the buckler member 36 is fabricated of a flexible, springy material, such as nylon resin sold by E. I. du Pont de Nemours and Company as Zytel ® 105-BK-10A. However, other materials such as an acetal resin sold by E. I. du Pont de Nemours and Company as Delrin ® 100 able to provide a biasing action which would inwardly displace the head 38 to the retracted position into the channel and withstand X-ray irradiation without becoming brittle, soft or otherwise losing its properties may be utilized. A colorant such as carbon black may be used in the material used to fabricate the buckler member 36 to color the buckler member 36 black to minimize any reflected light from reaching the film. It is desirable that the materials of construction be amenable to fabrication of the buckler member economically, as by injection molding. An integral or single piece structure for the buckler member 36 is preferred.

If rigid materials are utilized to fabricate the buckler member 36, any suitable separate biasing arrangement as a leaf spring or coil spring may be utilized to impart the desired biasing action.

The buckler assembly 12 further includes an actuating cam 60. The actuating cam 60 is mounted to the cam rail assembly 28 and includes a first ramp-like engaging surface 62, a second, preferably flattened, dwell surface 64, and a third ramp-like release surface 66. Although the Figures illustrate the surfaces 62, 64 and 66 as defining distinct corners, it is also contemplated that a continuous surface having engaging, dwell and release portions may be used.

In operation, as the cam rail 28 responds to an actuating force in a direction 68 towards the upper wall 14U of the frame 14, cam surfaces 30 on the cam rail 28 engage the biasing elements 24 to relieve the biasing force imposed on the backing plate 22. Simultaneously, the engaging surface 62 of the actuating cam 60 is brought into an abutting relationship with the cam riding surface 46 of the head portion 38 of the buckler member 36. The head portion 38 responds to the engagement of the engaging riding 46 and the surface 62 of the cam by pivoting inwardly of the cassette to bring the film contacted edge 50 into contact with the edge of the film sheet 32.

Figure 2:
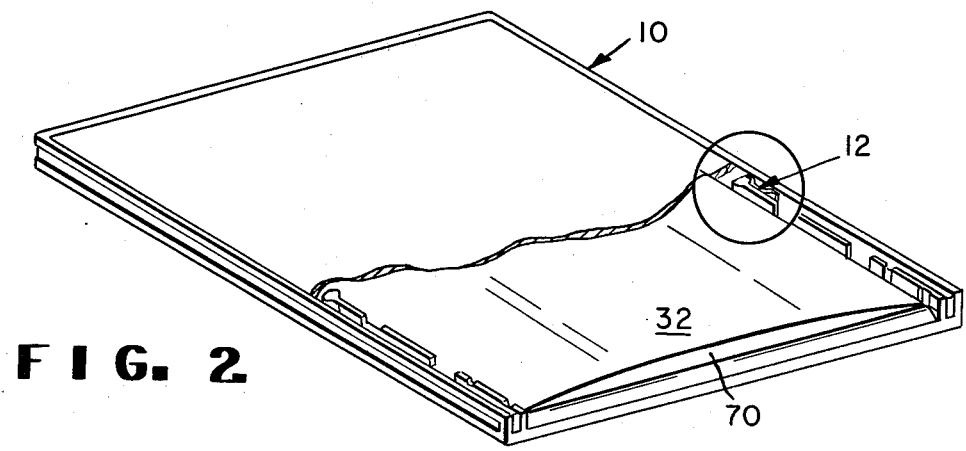
FIG. 2 is a perspective view similar to FIG. 1 illustrating a film sheet in a buckled condition.
Figure 8:
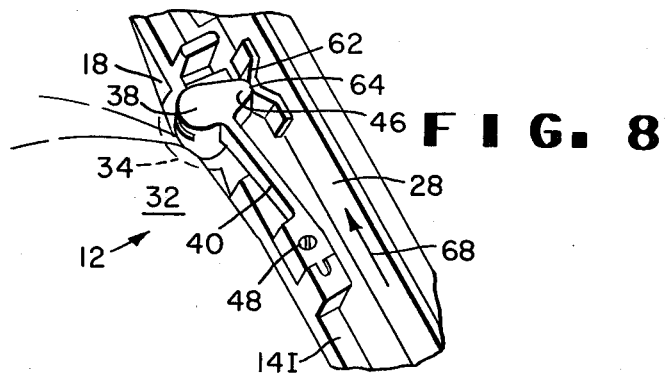
FIGS. 7, 8 and 9 are enlarged views of a portion of FIG. 1 illustrating the buckler in the pre-engaged, engaged (dwell) and release positions, respectively.
Figure 7:
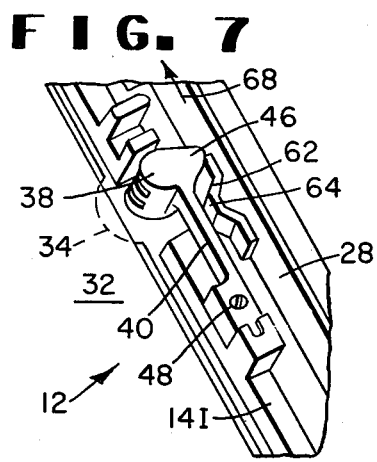
Figure 9:
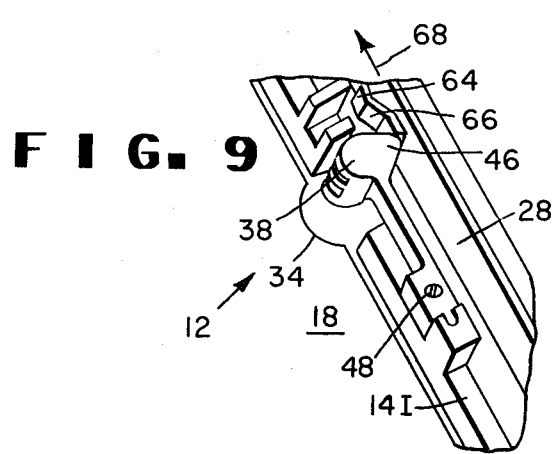

Continued motion of the cam rail 28 in the direction 68 pushes the edges of the film 32 from opposing directions inwardly of the cassette resulting in the edges of the film 32 being caught by the catches 54 to buckle the film. The film in the buckled state is shown in FIG. 2. As the film buckles, a gap 70 (FIG. 2) is formed permitting air to flow thereinto releasing the film from the screen. The film is maintained in the buckled state during continued motion of the cam rail 28 in the direction 68 by the engagement of the dwell surface 64 on the actuating cam with the cam riding surface 46 on the head 38 to assure complete release of the film from the intensifying screens. As motion of the cam rail 28 continues in the direction 68, the release portion 66 of the actuating cam 60 is brought into juxtaposition with the cam riding surface 46, and the biasing force imposed by the resiliency of the buckler arm 40 becomes dominant and returns the head 38 to the retracted position (FIGS. 7 and 9) allowing the film to fall from the now spaced apart intensifying screens and through a slot in the upper wall 14U of the frame 14 into a receiving receptacle below.

Once the film has been released, the actuating force on the cam rail 28 is removed and a bias spring disposed in the channel sidewalls 14S of the frame 14 returns the cam rail 28 to its original position, thus completing the unloading cycle.

Those skilled in the art having the benefits of the teachings of the instant invention as hereinabove set forth may effect numerous modifications thereto. For example, the portion of the buckler carrying the film engaging surface and the portion carrying the cam riding surface may be disposed at any convenient locations on alternate sides of the arm and need not be necessarily adjacent to each other. Although the radius of the cam riding surface is shown in the drawings as being less than the radius of the film engaging surface (FIG. 3) any configuration of the cam riding surface which permits the cam surface on the buckler head to accurately follow the profile of the actuating cam while simultaneously minimizing wear at the buckler/actuating cam interface lies within the contemplation of this invention. These and other modifications are to be construed as lying within the contemplation of the instant invention as defined in the appended claims.

What is claimed is:

1. In an x-ray cassette of the type having
   a fixed and movable plate;
   a film sheet receivable between the plates;
   means for biasing the movable plate toward the fixed plate;
   bias release means adapted to release the biasing force from the movable plate;
   a buckler member having an arm, the buckler member also having a film engaging edge and a cam riding surface;
   an actuating cam assembly operatively associated with the bias release means to engage the cam riding surface to thereby displace the buckler member from a retracted position to a film engaging position to bring the film engaging edge of the buckler into edgewise contact with the film to buckle the same from the plate, characterized in that
   the film engaging edge of the buckler member extends substantially perpendicular to the plane of the film, the arm is disposed intermediate of the film engaging surface and the cam riding surface, the arm is fabricated of a flexible springy material adapted to bias the buckler head to return it to its retracted position.

2. The cassette of claim 1 further characterized in that the film engaging edge of the buckler member is provided with upper and lower film catches, one of which upon displacement of the buckler member engages the edge of the film to buckle the same.

3. The cassette of claims 1 or 2 further characterized in that the actuating cam assembly includes a flattened dwell portion which when engaged against the cam riding surface maintains the edge of the buckler member against the edge of the film at a predetermined displacement inwardly of the frame.

4. The cassette of claims 1 or 2 wherein the arm is fabricated of nylon.

5. The cassette of claim 4 wherein the buckler comprises a head portion having the film engaging edge thereon and an arm, and wherein the arm is integrally formed with the head.

6. The cassette of claim 5 wherein the arm is fabricated of nylon colored in a nonreflective color.

7. The cassette of claim 2 wherein the upper and lower film catches each are a protuberance from the film engaging surface.

8. The cassette of claim 2 wherein the upper and lower film catches each are a notch formed into the film engaging surface.

9. The cassette of claim 2 wherein one of the upper and lower film catches is a protuberance from the film engaging surface while the other of the film catches is a notch formed into the film engaging surface.

10. The cassette of claim 4 wherein the upper and lower film catches each are a protuberance from the film engaging surface.

11. The cassette of claim 4 wherein the upper and lower film catches each are a notch formed into the film engaging surface.

12. The cassette of claim 4 wherein one of the upper and lower film catches is a protuberance from the film engaging surface while the other of the film catches is a notch formed into the film engaging surface.

* * * * *